United States Patent [19]

Sondhe

[11] 4,050,943
[45] Sept. 27, 1977

[54] TREATMENT MATERIAL AND METHOD FOR EXPOSED AGGREGATE CONCRETE CASTING

[76] Inventor: Ratanjit S. Sondhe, c/o H.S.H. Enterprises, Inc. 10643-B Kinsman Road, Newbury, Ohio 44065

[21] Appl. No.: 555,353

[22] Filed: Mar. 5, 1975

Related U.S. Application Data

[63] Continuation-in-part of Ser. No. 322,065, Jan. 8, 1973, abandoned.

[51] Int. Cl.² .............................................. C08L 1/28
[52] U.S. Cl. ..................................... 106/12; 106/178; 106/181; 106/187; 106/189; 106/193 D
[58] Field of Search .................... 427/133; 106/38.23, 106/12, 178, 181, 187, 189, 197, 188, 193 D; 424/35

[56] References Cited

U.S. PATENT DOCUMENTS

| | | | |
|---|---|---|---|
| 3,043,747 | 7/1962 | Long | 106/197 R |
| 3,314,809 | 4/1967 | Klug | 106/189 |
| 3,347,689 | 10/1967 | Futami et al. | 106/187 |
| 3,362,847 | 1/1968 | Day | 106/178 |
| 3,943,063 | 3/1976 | Morishita et al. | 424/35 |

Primary Examiner—Lorenzo B. Hayes
Attorney, Agent, or Firm—Frank B. Robb

[57] ABSTRACT

There is disclosed a method of and composition for making exposed aggregate concrete castings which comprises applying a film to the face of the mold or form, comprising a chelating agent to prevent the setting of the cement to a pre-determined depth at the face, whereby the ultimate appearance of the casting is decorative and the removal of the matrix to produce such appearance is effected by water, the penetration of the compound into the face depending on the selection and concentration of various ingredients. A single film only is applied to the form, and the material from which the film is formed includes cellulose ethers, aliphatic hydroxy acid or salts thereof, and one or a mixture of the lower aliphatic alcohols selected from the group methanol, ethanol or iso-proponol or a ketone. A plasticizer is often used as well as an identifying dye.

9 Claims, 2 Drawing Figures

4,050,943

TREATMENT MATERIAL AND METHOD FOR EXPOSED AGGREGATE CONCRETE CASTING

This application is a continuation in part of application Ser. No. 322,065 filed Jan. 8, 1973 now abandoned.

THE PRIOR ART

The prior art methods and compositions for producing exposed aggregate concrete castings have certain limitations including primarily the requirement that in order to produce a given depth or etch, the concrete mixture must remain in the mold a closely controlled period of time to permit the film carried thereby to perform its function of retarding the setting of the concrete at the face, and in the matrix, the time of such contact determining the depth of etch since if not accurately controlled, lack of uniformity of the finished product surface will be the result. Further, a transfer residue is left on the forms which is often extremely difficult to remove, even though a primer or undercoat is used on the mold to prevent adhesion of the concrete thereto.

The prior art requires the application of the retardant after an initial painting of the mold with a primer to prevent the adhesion heretofore referred to, the retardant film being critical in its thickness, as well as the time of contact with the face or ultimate surface to be exposed.

Since the thickness of coating is critical in the prior art compositions, and likewise the methods of applying such retardants, any non-uniformity of such application is reflected in the ultimate surface of the finished product by unevenness of depth of etch.

The thickness of the coating and the composition thereof is additionally critical when it is borne in mind that constant mixing of the prior art composition is required to maintain sufficiently uniform distribution of the constituents thereof to provide a reasonably satisfactory surface.

Further, the prior art compositions, by reason of the necessity to apply the film over a primer or undercoat, additionally increases the time required for drying the same prior to the use of the mold or form to receive the aggregate which provides the ultimate casting.

There are additionally further critical areas of applicatiom of the composition of the prior art as where a high vertical surface is desired to be etched, since in many of the formulations the composition is truly a mixture and the various factors heretofore pointed out cause a variation in the concentration of the respective constituents and thus, variation in the depth of etch from top to bottom of the finished product.

OBJECT OF THE INVENTION

In view of the various factors heretofore noted as respects certain characteristics of the prior art retardants, the instant invention has approached the problems in an entirely different way by providing a material or composition which may be applied in the form of film to the mold or form, the film including a chelating material and not requiring preliminary mixing, and by reason of its water solubility obviating the difficulties in respect of cleaning the forms or molds in which the casting is formed, and removing the matrix from the finished product.

The objective of the foregoing is attained by actually preventing the setting of the concrete surface material, by the use of a composition incorporating a chelating agent therein, the actual depth of penetration of the setting preventing action being determined by the composition of the film and the concentration of the agents, including the chelating agent, all the foregoing as far as desired depth is concerned normally being primarily related to the size of aggregate and the desired exposure thereof.

The fact that the formulation of the instant composition depends upon the concentration of various constituents thereof obviates the time element as a critical feature, and the action is such that it prevents the concrete elements of the material from adhering to the mold, enabling the removal thereof by water and simple washing procedures.

The very fact that the concrete face material and depth thereof usually referred to as the matrix, is likewise prevented from setting, enables the removal of the residue to provide the exposure desired by water and simple washing techniques without using high pressure or wire brushing therefore.

The further fact that many of the compositions of this formulation do not require constant mixing, but are mixed initially and remain in mixed condition during application, enables greater uniformity of depth of exposure or penetration, and the water solubility thereof as before pointed out increases the facility of use of the material for vertical surfaces and face up castings.

One of the outstanding advantages of the formulation hereof is the simplicity of etching face up castings to provide a uniform depth of reveal thereat, attained without special procedures or formulation required with prior mixtures.

A further advantage of the instant formulation resides in the non-toxic nature thereof, and the virtual predictability which is related to the concentration of various constituents and thus the depth of etch may be controlled for the varying sizes of aggregate within very close limits.

Since the exposed aggregate concrete structure is primarily one in which decorative features are desired, the factors which make this material advantageous are summarized by stating that the depth of etch, the drying time for the film used to provide such depth, single coat application and sparing water solubility providing complete transfer of the film to the concrete mixture at the surface thereof, combined with the easy removal of the matrix, and clean up of the molds, result in a uniform, attractive and at the same time sound face for architectural purposes.

Whereas some of the most important aspects of this invention reside in the ability to etch high vertical and upper faces, reference is made to the appended drawing wherein.

DESCRIPTION OF THE INVENTION

Figure 1:
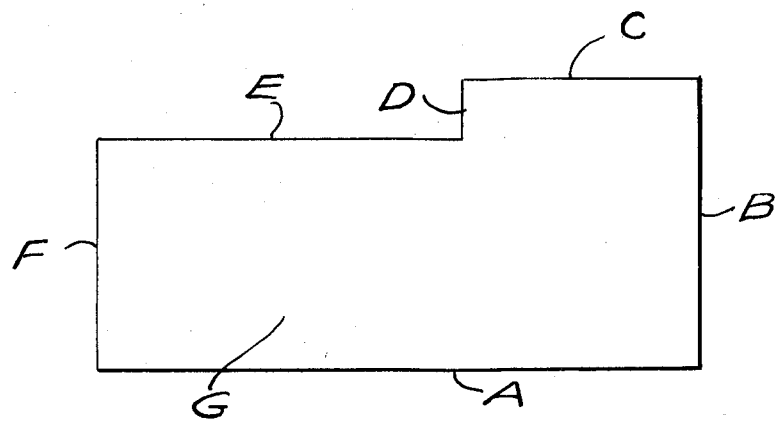
FIG. 1 is a side elevational view of a concrete casting which is an example useful for the description herein.

The instant invention as previously suggested, comprises a formulation in which the same includes a chelating composition for aluminum and calcium, preferably an aliphatic hydroxy compound, a film former which is preferably natural or synthetic resins, which have been made water soluble by the introduction of polar groups into the molecule, and which are readily soluble in low aliphatic alcohols or ketones, and a volatile film carrier, preferably comprising one of the lower aliphatic alcohols selected from the group ethanol, methanol and isoproponol or a ketone, as basic necessary elements hereof whereby the application of the film to a mold or form will produce the desired etch results previously outlined herein.

Broadly, the use of any natural or synthetic resin which has been made water soluble by the introduction of polar groups into the molecule and which are readily soluble in lower aliphatic alcohols or ketones is possible, since the film former is not a reactive agent, but merely serves as a vehicle to apply the chelating agent to the walls. Thus, if it is soluble in the designated alcohols and ketones, it can be applied, and if water soluble will be removed by dissolving in the water on the surface or the wet concrete and deposit the chelating agent thereon. Examples of suitable film formers in this group include water soluble cellulose polar in nature and readily soluble in alcohols or ketones such as hydroxy propyl cellulose, ethyl cellulose, hydroxy ethyl cellulose, poly vinyl alcohol and poly carbonates.

Assuming that the film carrier is methanol, the film former which is at least sparingly soluble in water, preferably is an hydroxy propyl cellulose which may be one of the proprietary formulations designated as Klucel-L, a product of Hercules Industries, is stirred thereinto. The chelating compound for aluminum and calcium is preferably an aliphatic acid such as citric acid, tartaric acid, and gluconic acid or salts thereof, especially the sodium and calcium salts or a mixture of the acids and/or salts. A plasticizer such as ethylene glycol may be used to produce a non-brittle film. A water soluble dye may also be added to indicate visually the coverage of the film and as a designation of the size of aggregate with which the composition is to be used.

In formulating the composition, the hydroxyl propyl cellulose is stirred into the alcohol until the solution is homogenous. The aliphatic hydroxy compound is then added thereto and mixed slowly for a predetermined time, which may be ascertained visually by determining that the solution is clear when poured into a test tube or more accurately by drawing off a small portion and centrifuging the same. If no residue remains after centrifuging, the mixture is in proper condition and may be drawn off for ultimate use.

The time for mixing is usually 1½ to 2 hours before any additional elements are added, such as a plasticizer in the form of ethylene glycol, and if it is desired to provide an identification coloring, a polar or fugitive dye is stirred into the solution thereafter.

The composition is then applied by spraying, brushing, or other techniques directly to the wall or walls of the mold or form which are to provide the ultimate face for the concrete surface which is to be etched without the need of any base coat or undercoating. The concrete is then poured into the form, allowed to set, and then the form removed.

The chelating compound in the film will be transferred with the film to the surface of the concrete, and will prevent the setting of the concrete on the surface. The depth of etch, or that to which the concrete is prevented from setting is controlled by varying the selection and/or composition of the chelating agent.

The primary basis for determining the desired depth of reveal or depth of etch as the case may be, is in large measure determined by the size of the aggregate which varies with different specifications. Therefore, the compositions and/or proportions of the ingredients, especially the chelating agents must be varied to achieve different depths of reveal. Experiments have shown different acids (tartaric, citric, gluconic) may be caused to work to different depths; the sodium salts of these acids in the same concentrations work to about the same depths as the acids, but the calcium salts in the same concentration work to lesser depths.

Also, it has been found by experimentation that the greater the concentration of the acid or the salt, the greater will be the depth of etch or reveal. However, the depth of reveal is not time dependent. Thus, by selecting and balancing the concentration and compositions of the chelating agents, a uniform and predictable depth of etch can be attained, and this depth will be independent of the time in the mold or form.

From a formulation standpoint, the acids are preferred over the salts since the acids are basically completely soluble in the alcohol whereas the salts are not. However, the acids may tend to react with basic materials which in some cases may be a drawback, favoring the use of salts which do not.

Some examples of formulations of the composition for different sizes of aggregate are as follows:

| Example A | |
|---|---|
| For A size aggregate (¼" to ⅜" maximum dimensions) | |
| Methanol | 87.08% |
| Klucel-L | 6.22% |
| Citric Acid | 2.76% |
| Ethylene Glycol | 3.87% |
| Dye* | .06% |
| *(A polar dye manufactured by Akron Chemical Co. under their number E 8152 and known in the dye industry as nitrosine, a water and alcohol soluble amine) | |
| Example B | |
| For B size aggregate (⅜" to ½" maximum dimensions) | |
| Methanol | 86% |
| Klucel-L | 5% |
| Citric Acid | 5.5% |
| Ethylene Glycol | 3% |
| Dye (see Example A) | |
| Example C | |
| For A size aggregate | |
| Methanol | 50% |
| Iso-proponol | 37.08% |
| Klucel-L | 6.22% |
| Citric Acid | 2.76% |
| Ethylene Glycol | 3.87% |
| Dye (see Example A) | |

The foregoing example avails of iso-propanol to improve sprayability of the composition where this is useful in applying the same to forms under many conditions.

It is to be understood that these examples are illustrative and not limiting, and that tests have shown that the formulations can be varied as described herein for the purposes described.

For example, while a number of lower aliphatic alcohols may be used alone, methanol is most often selected where cost is a consideration. Iso-propanol is much more expensive and thus only used where some characteristic thereof is desired such as that of sprayability.

In some cases, a combination of alcohols will provide the necessary plasticizing effect, the purpose being to improve spreadability and reduce brittleness.

Since the depth or reveal or depth of etch is variable in accordance with the concentration and composition of the various compounds heretofore recited, it may be pointed out that by varying the respective compounds incorporated in the composition, within certain limits, the type of surface presented in the ultimate finished product will be correspondingly varied.

The composition can be varied as follows:

| Resin (film former) | 3%–10% |
|---|---|
| Aliphatic hydroxy compound (chelating agent) | 2%–5.5% |
| Alcohols or Ketones (film carrier) | 84.5%–95% |

More preferably, it may be suitable to very the resin film former between 5% and 8%, the lower aliphatic alcohol or mixture thereof, or ketone, between 86% and 88%, the aliphatic hydroxy compound between 2% and 5%, ethylene glycol between 1% and 5%, and the dye between 0.02% and 0.07%, all the foregoing by weight.

Where larger size aggregate is required to be used by reason of the type of surface or form of reveal desired, such as where type "C" or type "D" aggregate is used, these being in the first instance ½ inch to ¾ inch in maximum dimension, and in the last instance ¾ inch to 1¼ inch in maximum dimension, other types of acids or salts thereof than citric acid will be used, such as tartaric or gluconic acid and their salts, especially the sodium and calcium salts, which have been utilized effectively.

In any case, the variation of the active ingredient such as citric acid or other aliphatic hydroxy acid or salts thereof, and the concentration thereof, are the determining factors in this composition by way of producing the depth of etch and at the same time providing for the removal of the residue or matrix where solubility in water is provided.

It has been ascertained that the type of cement used is not a controlling factor, and the formulation hereinbefore described has been used with high early cement with very satisfactory results, regular cement although requiring a longer setting period likewise being suitable. The type of cement used is dependent upon the ultimate product and its use or application, and by variation of type, size and composition of aggregate, as well as the factors which go to comprise the cost of production thereof.

The fact that the film provided by the composition hereinbefore described in detail, and as to its general characteristics is sparingly soluble in water, a characteristic of hydroxy propyl cellulose, will facilitate the use of the same in the production of closely controlled, uniform, predictable variable depth exposed aggregate concrete structures, the primary features of the invention being its general adaptability without specifically critical thickness of film application, the rapid drying of the film so that frequency of use of the form may be increased, the time aspect of setting and cleaning of the forms in this instance not affecting the ultimate appearance, since only a certain amount of penetration of the composition into the surface of the product is accomplished depending upon the constituents thereof, as applied to the form. The removal of the forms and the ultimate cleaning thereof may be wide ranging in point of time with the residue on the forms and matrix on the product being easily prepared for ultimate use by simple washing procedures with water.

Basically, because of the sparingly soluble nature of the film former, the film is gradually transferred from the form to the surface of the cast concrete, resulting in an easily cleanable powdery residue on the form and on the surface of the cast concrete.

It is pointed out further that no highly toxic solvents are required to clean the forms or the product, and thus additional safety is provided in the manufacture and use of the castings.

In the production of castings which are to be provided with high vertical and face-up surfaces having a uniform depth of reveal, the same formulation is used as with any other surface upon which the reveal is to be effected, and the face-up casting surface is readily provided without special forms or intricate procedure, and irrespective of whether the same are made as pre-cast units or cast in place.

Figure 2:
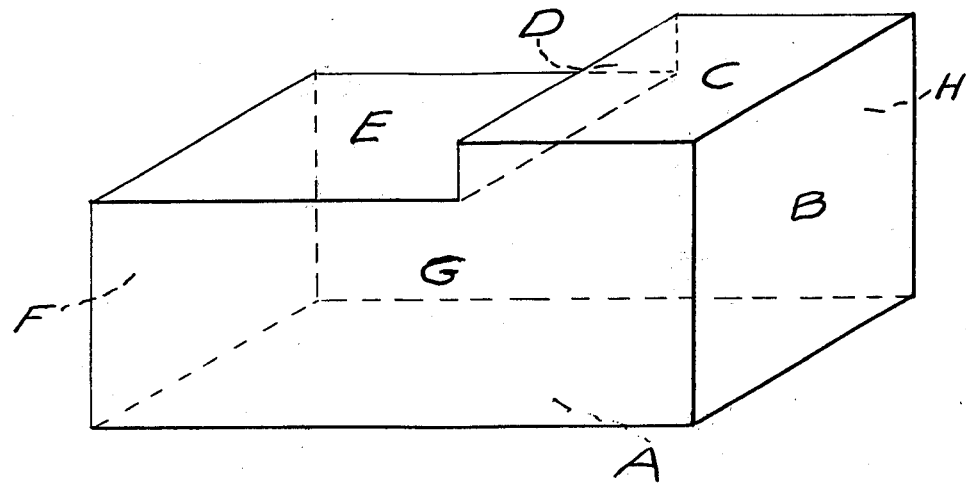
FIG. 2 is a perspective view of the casting of FIG. 1.

In FIGS. 1 and 2 of the drawing, an example of a simple casting is disclosed, wherein the surfaces or sides A, B and C are to be etched.

Assuming that the product is a pre-cast unit, a form is provided in which sides A,B,D,E,F,G and H are arranged to be formed in the form by concrete poured through the area comprising side C, but only sides A,B and C are to be etched to provide the reveal sought.

In this instance, the formulation hereof is painted or sprayed or otherwise applied as a film on those surfaces of the mold which will provide sides A and B. Thereafter, the concrete is poured into the mold and suitably vibrated or otherwise treated as usual.

When the bleed water has evaporated or otherwise been removed from the portion ultimately constituting side C so that the surface may be coated by brushing, rolling or spraying, the formulation hereof for the particular size of aggregate is applied thereto. It will perform its function of preventing the setting of the cement as hereinbefore described, to a predetermined depth, time not controlling the same, nor is any cover or seal necessary to be used as with the prior art retardants which depend on time and controlled conditions of moisture to perform their function.

In this instance, when the concrete has sufficiently set to permit stripping the mold sides constituting the form, this is effected and the mold cleaned by ordinary water pressure when desired, since this formulation does not cause concrete or cement to adhere thereto.

Similarly since the depth or penetration of the composition hereof was predetermined by the constituents, the same will have been transferred to the surface area of the concrete from the side of the form by which the same is contained; surfaces A, B and C will likewise be washed by water, and the aggregate reveal will be uniform thereover as described herein, even though the washing is delayed because the setting of the concrete surfaces to a certain depth has been prevented, rather than merely delayed as in the prior art retardants which depend upon the control of time in contact.

It should also be noted that the high vertical surface B will have produced thereon the same degree or depth of reveal as surfaces A and C, such depth being uniform from top to bottom because the composition of this invention is uniform and in suspension and when applied will remain uniform over the surface. Even if it does sag or run somewhat, this will not substantially affect the ultimate product so long as sufficient film is available on the form to perform its function, in part at least depending upon the sparing solubility thereof in water, whereby it is transferred to the concrete for the purposes hereof.

I claim:

1. A composition for preventing the setting of concrete comprising by weight from 3% to 10% of a film former dissolved in from 84.5% to 95% of an aliphatic alcohol having 1 to 3 carbon atoms, and from 2% to 5.5% of a chelating compound; wherein said film former is a cellulose ether of the type which is soluble in both water and said aliphatic alcohol; and wherein said chelating compound is selected from the group consisting of citric, tartaric, and gluconic acids, the sodium and calcium salts of these acids, and mixtures thereof.

2. A composition as claimed in claim 1 wherein the film former is an hydroxy propyl cellulose.

3. A composition as claimed in claim 1, wherein a plasticizer is mixed in the composition.

4. A composition as claimed in claim 3, wherein the plasticizer is ethylene glycol.

5. The composition as claimed in claim 1, wherein the percentage of film former is from 5% to 7% and the aliphatic alcohol is from 86% to 88%.

6. A composition for preventing the setting of concrete comprising by weight 6.22% hydroxy propyl cellulose dissolved in 87.08% methanol, 2.76% citric acid, 3.87% ethylene glycol and .06% polar dye.

7. A composition for preventing the setting of concrete comprising by weight 5% hydroxy propyl cellulose dissolved in 86% methanol, 5.5% of a chelating compound, 3% ethylene glycol, and 0.05% polar dye, wherein said chelating compound is selected from the group consisting of citric, tartaric, and gluconic acids, the sodium and calcium salts of these acids, and mixtures thereof.

8. A method of making a composition to prevent the setting of concrete which comprises dissolving from 3% to 10% of a film former in from 84.5% to 95% of an aliphatic alcohol having 1–3 carbon atoms and adding thereto from 2% to 5.5% of a chelating compound, and mixing slowly until the mixture is homogeneous, wherein the percentages are by weight based on the total composition being 100%, wherein said film former is a cellulose ether of the type which is soluble in both water and said aliphatic alcohol, and wherein said chelating compound is selected from the group consisting of citric, tartaric, and gluconic acids, the sodium and calcium salts of those acids, and mixtures thereof.

9. The method as claimed in claim 8, wherein additional ingredients are added by weight percentages as follows:

Ethylene glycol between 1% and 5%
Polar dye between 0.02% and 0.07%.

* * * * *